(12) United States Patent
Manning et al.

(10) Patent No.: US 7,246,999 B2
(45) Date of Patent: Jul. 24, 2007

(54) STEPPED OUTLET TURBINE AIRFOIL

(75) Inventors: Robert Francis Manning, Newburyport, MA (US); Thomas Edward Demarche, Boxford, MA (US); David Allen Flodman, Rowley, MA (US)

(73) Assignee: General Electric Company, Schenectady, NY (US)

(*) Notice: Subject to any disclaimer, the term of this patent is extended or adjusted under 35 U.S.C. 154(b) by 276 days.

(21) Appl. No.: 10/959,615

(22) Filed: Oct. 6, 2004

(65) Prior Publication Data

US 2006/0073017 A1 Apr. 6, 2006

(51) Int. Cl.
*B63H 1/14* (2006.01)
(52) U.S. Cl. ............... 416/97 R; 415/115; 415/116
(58) Field of Classification Search .......... 416/96 R, 416/96 A, 97 R, 97 A; 415/115, 116
See application file for complete search history.

(56) References Cited

U.S. PATENT DOCUMENTS

| 3,533,711 | A | 10/1970 | Kercher |
| 4,197,443 | A | 4/1980 | Sidenstick |
| 4,303,374 | A | 12/1981 | Braddy |
| 4,500,258 | A | 2/1985 | Dodd et al. |
| 4,601,638 | A | 7/1986 | Hill et al. |
| 4,664,597 | A | 5/1987 | Auxier et al. |
| 4,672,727 | A | 6/1987 | Field |
| 4,676,719 | A | 6/1987 | Auxier et al. |
| 4,738,588 | A | 4/1988 | Field |
| 5,096,379 | A * | 3/1992 | Stroud et al. .......... 416/97 R |
| 5,097,660 | A | 3/1992 | Shekleton |
| 5,246,341 | A | 9/1993 | Hall et al. |
| 5,368,441 | A | 11/1994 | Sylvestro et al. |
| 5,462,405 | A | 10/1995 | Hoff et al. |
| 5,503,529 | A | 4/1996 | Anselmi et al. |
| 6,132,169 | A | 10/2000 | Manning et al. |
| 6,241,468 | B1 | 6/2001 | Lock et al. |
| 6,599,092 | B1 | 7/2003 | Manning et al. |
| 6,969,230 | B2 * | 11/2005 | Shi et al. .................. 415/115 |
| 7,033,136 | B2 * | 4/2006 | Botrel et al. .............. 415/115 |

* cited by examiner

*Primary Examiner*—Hoang Nguyen
(74) *Attorney, Agent, or Firm*—William S. Andes; Francis L. Conte

(57) ABSTRACT

A turbine airfoil includes an internal cooling circuit between opposite pressure and suction sidewalls. The pressure sidewall includes a row of outlet slots for the circuit separated by converging partitions. Each slot includes an inlet, throat, and diverging outlet. Each of the partitions includes a step in a converging sidewall thereof for increasing divergence of the slots to diffuse coolant discharged therethrough.

23 Claims, 3 Drawing Sheets

STEPPED OUTLET TURBINE AIRFOIL

BACKGROUND OF THE INVENTION

The present invention relates generally to gas turbine engines, and, more specifically, to turbine airfoil cooling.

In a gas turbine engine air is pressurized in a compressor and mixed with fuel in a combustor for generating hot combustion gases. The hot gases are channeled through various stages of a turbine which extract energy therefrom for powering the compressor and producing work, such as powering an upstream fan in a typical aircraft turbofan engine application.

The turbine stages include stationary turbine nozzles having a row of hollow vanes which channel the combustion gases into a corresponding row of rotor blades extending radially outwardly from a supporting rotor disk. The vanes and blades have corresponding airfoil configurations, and are hollow with corresponding cooling circuits therein. Since the heat loads from the combustion gases vary over the pressure and suction sides of the vanes and blades, the cooling circuits therein are correspondingly different for best using the limited cooling air available.

The cooling air is typically compressor discharge air which is diverted from the combustion process and therefore decreases overall efficiency of the engine. The amount of cooling air must be minimized for maximizing the efficiency of the engine, but sufficient cooling air must nevertheless be used for adequately cooling the turbine airfoils for maximizing their useful life during operation.

Each airfoil includes a generally concave pressure sidewall, and an opposite, generally convex suction sidewall extending longitudinally or radially in span and axially in chord between leading and trailing edges. For a turbine blade, the airfoil span extends from a root at the radially inner platform to a radially outer tip spaced from a surrounding turbine shroud. For a turbine vane, the airfoil extends from a root integral with a radially inner band to a radially outer tip integral with an outer band.

Each turbine airfoil also initially increases in thickness aft of the leading edge and then decreases in thickness to a relatively thin or sharp trailing edge where the pressure and suction sidewalls join together. The wider portion of the airfoil has sufficient internal space for accommodating various forms of internal cooling circuits and turbulators for enhancing heat transfer cooling inside the airfoil, whereas the relatively thin trailing edge has correspondingly limited internal cooling space.

Each airfoil typically includes various rows of film cooling holes extending through the sidewalls thereof which discharge the spent cooling air from the internal circuits. The film cooling holes are typically inclined in the aft direction toward the trailing edge and create a thin film of cooling air over the external surface of the airfoil that provides a thermally insulating air blanket for additional protection against the hot combustion gases which flow over the airfoil surfaces during operation.

The thin trailing edge is typically protected by a row of trailing edge cooling slots which breach the pressure sidewall immediately upstream of the trailing edge for discharging film cooling air thereover. Each trailing edge outlet slot has an exposed outlet aperture in the pressure side which begins at a breakout lip and is bounded in the radial direction by exposed lands at the aft ends of axial partitions which define the outlet slots.

The axial partitions are integrally formed with the pressure and suction sides of the airfoil and themselves must be cooled by the air discharged through the outlet slots defined thereby. The partitions typically converge in the aft direction toward the trailing edge so that the outlet slots diverge toward the trailing edge with a shallow divergence angle that promotes diffusion of the discharged cooling air with little if any flow separation from the sides of the partitions.

Aerodynamic and cooling performance of the trailing edge outlet slots is directly related to the specific configuration of the outlet slots and the intervening partitions. The flow area of the outlet slots regulates the flow of cooling air discharged through the slots, and the geometry of the slots affects cooling performance thereof.

The row of trailing edge outlet slots typically extends for the full radial span of the trailing edge for providing cooling completely therealong. The divergence or diffusion angle of the outlet slots is typically limited to about 7.5 degrees for maximizing diffusion efficiency without effecting undesirable flow separation of the discharged cooling air which would degrade performance and cooling effectiveness of the discharged air.

Accordingly, these geometrical constraints on discharge flow area and divergence angle determine the number and pitch spacing of the outlet slots along the trailing edge.

The portions of the thin trailing edge directly under the individual outlet slots are effectively cooled by the discharged cooling air, with the discharged air also being distributed over the intervening exposed lands at the aft end of the partitions. However, those lands are nevertheless solid portions of the pressure sidewall integrally formed with the suction sidewall and must rely for cooling on the air discharged from the adjacent trailing edge outlets.

Notwithstanding the small size of the these outlet lands and the substantial cooling performance of the trailing edge outlet slots, the thin trailing edges of turbine airfoils nevertheless typically limit the life of those airfoils due to the high operating temperature thereof in the hostile environment of a gas turbine engine.

Accordingly, it is desired to provide a turbine airfoil having improved trailing edge cooling for improving airfoil durability and engine performance.

BRIEF DESCRIPTION OF THE INVENTION

A turbine airfoil includes an internal cooling circuit between opposite pressure and suction sidewalls. The pressure sidewall includes a row of outlet slots for the circuit separated by converging partitions. Each slot includes an inlet, throat, and diverging outlet. Each of the partitions includes a step in a converging sidewall thereof for increasing divergence of the slots to diffuse coolant discharged therethrough.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
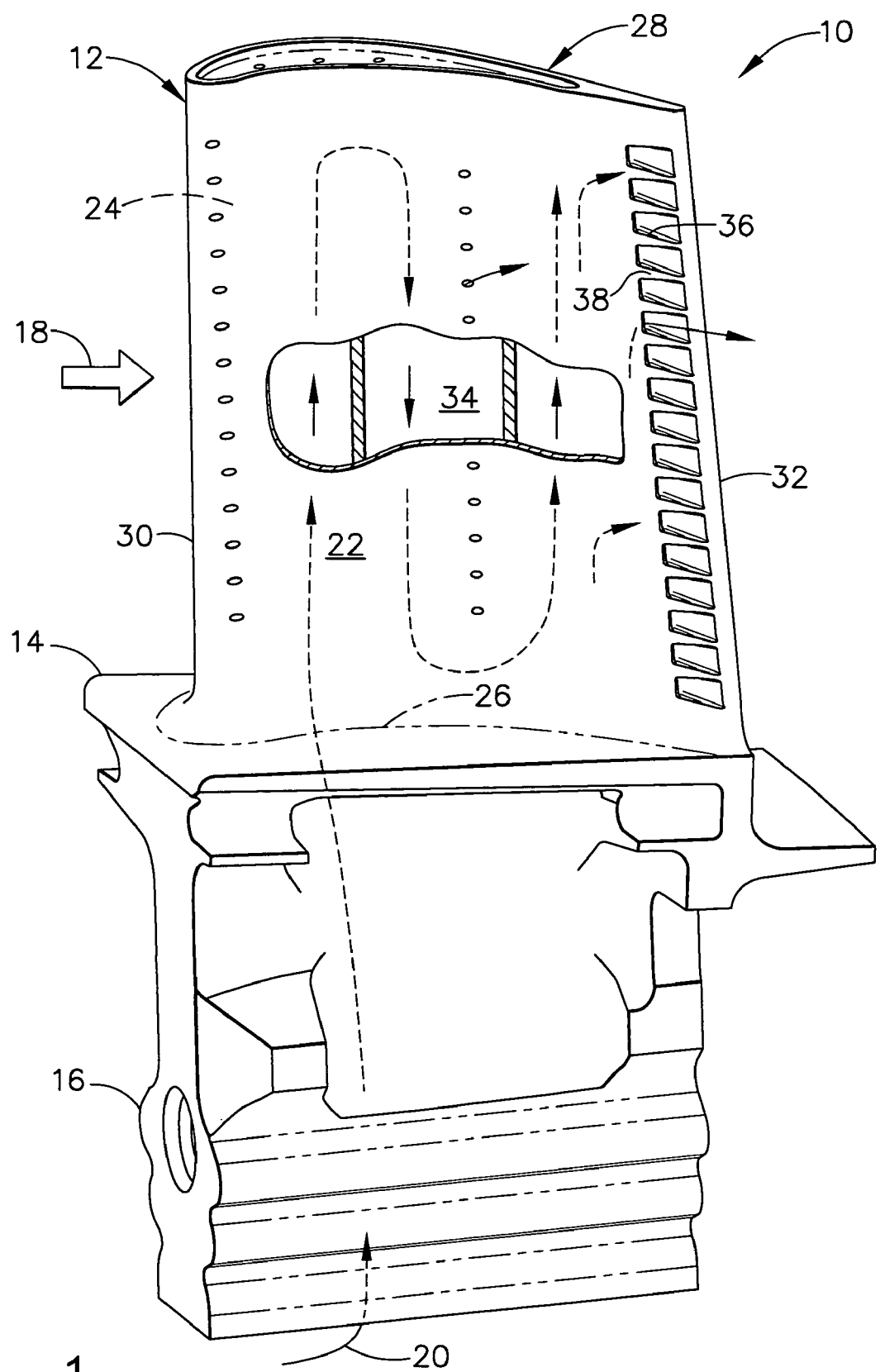
FIG. 1 is a partly sectional, elevational view of an exemplary turbine rotor blade.

Illustrated in FIG. 1 is an exemplary first stage turbine rotor blade 10 for use in a gas turbine engine for aircraft, marine, or industrial applications. The blade includes an airfoil 12 integrally formed with a platform 14 and an axial entry dovetail 16 for being mounted in the perimeter of a supporting rotor disk (not shown).

During operation, combustion gases 18 are generated in the engine and flow downstream over the turbine airfoil 12 which extracts energy therefrom for rotating the disk supporting the blade for powering the compressor (not shown). Air 20 pressurized in the compressor is mixed with fuel and ignited for generating the hot combustion gases, and a portion of that pressurized air is suitably channeled to the blade for cooling thereof during operation.

More specifically, the airfoil 12 includes a generally concave pressure sidewall 22 and a circumferentially or laterally opposite, generally convex suction sidewall 24. The two sidewalls extend longitudinally or radially in span from a root 26 at the platform 14 to a radially outer tip 28. The sidewalls also extend axially in chord between opposite leading and trailing edges 30,32.

The airfoil is hollow with the two sidewalls 22,24 being spaced laterally apart between the leading and trailing edges to define an internal cooling cavity or circuit 34 therein for circulating during operation the pressurized cooling air or coolant 20 diverted from the compressor.

The internal cooling circuit 34 may have any conventional configuration and is typically defined by radially extending partitions integrally bridging the two sidewalls, with various forms of short turbulator ribs lining the internal surfaces of the sidewalls for enhancing heat transfer cooling performance.

As indicated above in the Background section, the typical airfoil configuration for the exemplary turbine rotor blade illustrated, as well as for typical stator nozzle vanes, increases in width from the leading edge 30 to a maximum width immediately aft therefrom, with the airfoil then converging to a relatively thin or sharp trailing edge 32. The size of the internal cooling circuit 34 therefore varies with the width of the airfoil, and is relatively thin immediately forward of the trailing edge where the two sidewalls integrally join together and form the thin trailing edge section of the airfoil.

In order to cool this thin trailing edge portion of the airfoil, the pressure sidewall 22 includes a radial row of trailing edge outlet slots 36 extending chordally therethrough along the span of the trailing edge 32 in flow communication with the internal cooling circuit 34 for discharging the coolant 20 therefrom during operation.

Figure 2:
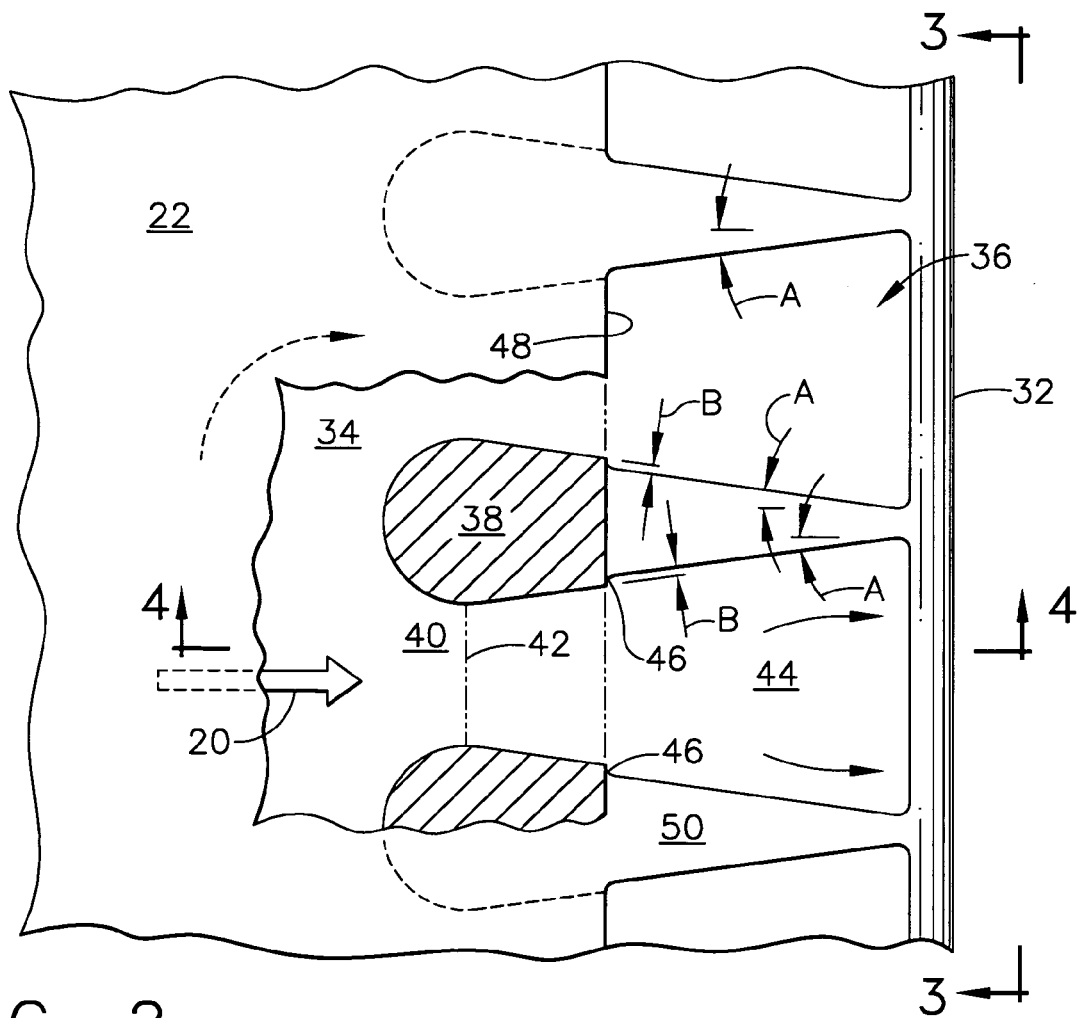
FIG. 2 is an enlarged, partly sectional, elevational view of trailing edge outlet slots in the airfoil illustrated in FIG. 1.

The trailing edge outlet slots 36 are illustrated in more particularity in FIG. 2. Each slot 36 diverges in most part in the downstream aft direction, and the slots are separated radially in span from each other by corresponding axial partitions 38 which converge in most part in the downstream aft direction toward the trailing edge 32.

Each slot 36 includes a converging or bellmouth inlet 40 at the forward end of the partitions 38 which is generally semicircular in section. The inlet converges to a throat 42 of minimum flow area which meters or regulates discharge of the coolant 20 through the outlet slots. The outlet slot diverges from the throat 42 aft toward the trailing edge 32 through an outlet 44 disposed along the aft ends of the partitions.

Correspondingly, each partition 38 initially diverges to define the corresponding converging inlets 40 terminating at the throat 42. Each partition then converges in the aft direction to the trailing edge 32. Each partition is generally radially symmetrical along the chord axis of the airfoil and includes opposite sidewalls which define the sides of the corresponding outlet slots.

Each of the slots 36 diverges aft with a divergence angle A which is sufficiently small or shallow for diffusing the coolant 20 discharged through the slots with minimal, if any, flow separation during operation. Diffusers are notoriously well known and require shallow diffusion angles to effect diffusion without undesirable flow separation. In this way, maximum efficiency of coolant air discharge may be obtained from the diffusion trailing edge outlet slots 36.

However, each partition 38 illustrated in FIG. 2 further includes a small step 46 which narrows the width of the partition aft therefrom, while correspondingly widening the outlets 44 aft therefrom for improving performance of the outlet slots. In particular, each step has a small magnitude or depth B which displaces inwardly the remainder of the partition sidewall aft therefrom for narrowing the width of the partition. The step provides an abrupt increase in flow area of the adjacent outlet slot, which corresponds with additional step-diffusion of the coolant without undesirable flow separation.

By limiting the size of the step 46, the conventional Coanda effect will ensure that the jet of coolant being discharged through the outlet slot 36 flows downstream over the step and immediately reattaches to the partition sidewall downstream therefrom. The introduction of the step not only enhances diffusion of the coolant being discharged but also significantly reduces the width of the partition, and therefore its weight and thermal mass, and correspondingly improves the cooling thereof from the coolant being discharged from the outlet slots.

As shown in FIG. 2, the step 46 may be positioned in the sidewall of the partition at a suitable axial location between the throat 42 and the trailing edge 32. Each partition converges between its two sidewalls aft from the slot throat 42 firstly to the step 46, and then further converges aft from the step 46 along the outlet 44 to the trailing edge 32. In this way, a step increase in flow area through the outlet slot occurs at the step 46, while the radial width of the partition abruptly decreases at the step as well as aft therefrom.

Figure 3:
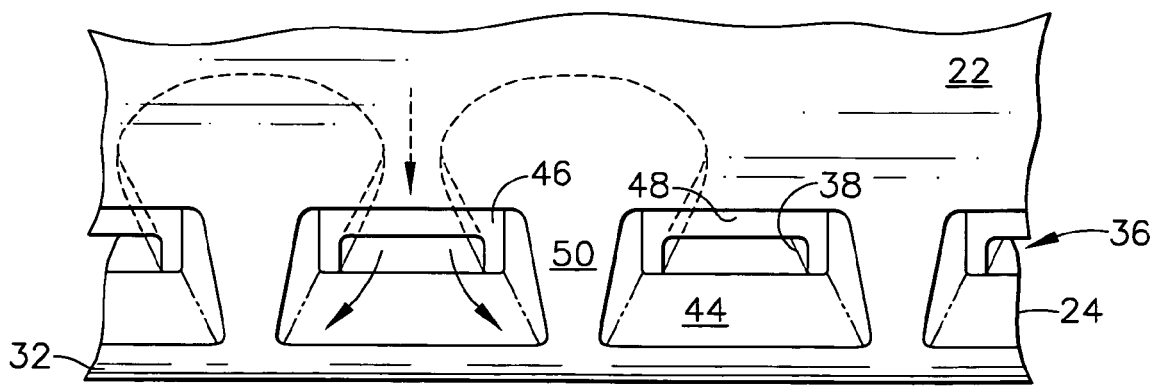
FIG. 3 is an end view of the trailing edge outlet slots illustrated in FIG. 2 and taken along line 3—3.
Figure 4:
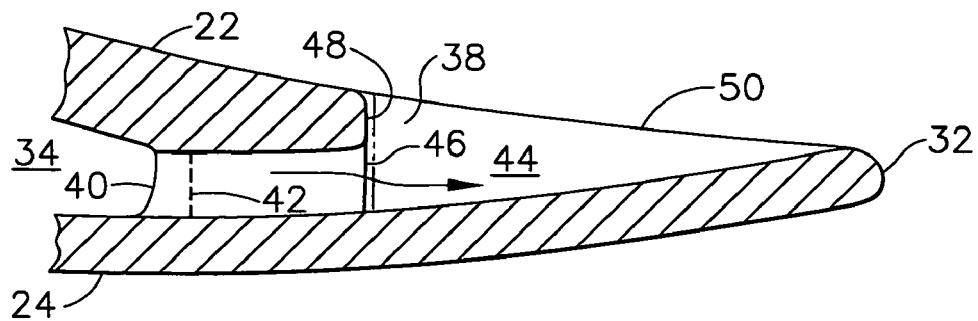
FIG. 4 is an axial sectional view of a portion of the airfoil illustrated in FIG. 2 and taken along line 4—4.

As additionally illustrated in FIGS. 3 and 4, each of the slot outlets 44 breaches the external surface of the pressure sidewall 22 at a breakout lip 48 spaced forward from the trailing edge 32. Each outlet 44 is radially bounded by exposed lands 50 forming the aft ends of the corresponding partitions 38, with the forward ends of the partitions extending forward or upstream toward the leading edge from the corresponding breakout lips 48.

In this way, the partitions 38 commence inside each airfoil upstream from the breakout lip 48 between the two sidewalls, and terminates in the exposed land portion 50 thereof at or near the trailing edge 32 as desired.

Correspondingly, each of the outlet slots 36 commences inside the airfoil in series flow communication from the internal cooling circuit 34 to the converging inlet 40, throat 42 of minimum flow area, and diverging outlet 44 exposed in most part in the pressure sidewall 22, and separated from adjacent outlets 44 by the exposed, converging lands 50 at the aft ends of the intervening partitions.

Since the lands 50 are extensions of the partitions 38, the exposed sidewalls thereof converge aft from the breakout lips 48 preferably with the same convergence angle A as the internal sidewalls of the partition which match the corresponding divergence angles A of the outlet slots both forward and aft of the common breakout lip 48.

The partition lands 50 are preferably coplanar or flush with the external surface of the pressure sidewall around each of the exposed slot outlets 44, including the common breakout lip 48 extending radially therebetween. This maximizes flow continuity of the pressure side of the airfoil.

As indicated above, each of the slots 36 has a shallow diffusion or divergence angle A, which may be up to about 7.5 degrees in the preferred embodiment effected by the equal convergence angle of the adjacent partitions between which the slots are defined. In this way, the coolant discharged through the diverging outlets is efficiently diffused without undesirable flow separation. And, the divergence angles of the slots are substantially equal to each other both forward and aft of the steps 46.

Correspondingly, each of the partitions 38 has a shallow convergence angle A, which is identical to the divergence angle of the slots, and is substantially equal forward and aft of the steps 46.

In the preferred embodiment illustrated in FIG. 2, the sidewalls of each partition 38 forward and aft of the step 46 are preferably straight and parallel with each other, with the step 46 decreasing the width of the exposed land 50 by the full step depth B along its full axial length.

Also in the preferred embodiment illustrated in FIG. 2, each of the partitions 38 includes a corresponding step 46 on each of its two opposite sidewalls which decreases the width of the converging land 50 by twice the depth B over the full axial extent thereof. Correspondingly, the two steps on each partition increase the flow area of the adjacent outlet slots on corresponding opposite sides thereof in a symmetrical manner.

Accordingly, each of the slots 36 decreases in flow area from its inlet 40 to the throat 42 of minimum flow area, and then increases in flow area from that throat to the step 46 in the sidewall of the partition 38. The flow area then further increases from the step 46 to the exposed outlet 44 of each slot, and as that outlet diverges to the trailing edge.

The depth B of the step 46 may be selected for minimizing the width of the converging land 50 for a given flow area of the throat 42, while maintaining efficient diffusion of the coolant being discharged through the outlet slots. For example, the depth B of the step may be in the exemplary range of about 4–20 mils for a typical turbine airfoil application, which will create a local increase in divergence of the slots and a local increase of diffusion of the coolant discharged therethrough, without undesirable flow separation from the partition sidewalls. The Coanda effect will ensure that the discharged cooling air flows downstream over the down-steps 46 and maintains flow attachment with the sidewalls of the land downstream therefrom.

In the preferred embodiment illustrated in FIGS. 2–4, the two steps 46 for each outlet slot 36 are aligned coplanar with each other and with the corresponding breakout lip 48. In this way, the exposed land 50 extending aft from the breakout lips 48 is substantially narrower by the magnitude of the two steps than it would otherwise be without the steps.

The weight and thermal mass of the lands are thus substantially reduced, which improves the cooling performance thereof. And, the coolant discharged from the diverging outlets 44 is more effective for cooling the narrower lands. Improved cooling along the entire span of the trailing edge may therefore be realized by the simple reduction in surface area of the exposed lands, while maintaining effective diffusion of the discharged coolant notwithstanding the given size of the slot throats 42.

In alternate embodiments, the steps 46 may be located aft of the breakout lips 48 which would delay narrowing of the converging land 50. Or, the steps may be located forward or upstream of the breakout lips 48 inside the airfoil and more closely adjacent to the slot throats 42.

In the exemplary embodiment illustrated in FIGS. 2–4, the steps 46 are disposed in the sidewalls of the partitions 38 only, and the internal surface of the suction sidewall 24 along the slots 36 remains smooth without steps therein. As shown in FIG. 3, this configuration introduces two steps 46 on opposite radial sides of each outlet slot 36 which cooperate with the, step formed by the breakout lip 48. The coolant being discharged from the outlet slots 36 may thusly expand from the entire perimeter of the exposed outlet 44 in the pressure side of the airfoil upon clearing the breakout lips.

Also in this embodiment, each of the slots 36 includes a single step 46 in each of the two bounding partitions 38, and the partitions have flat and parallel sidewalls both forward and aft of the single steps therein with the same shallow convergence angle A. The corresponding divergence angle A of each outlet slot 36 is therefore identical both forward and aft of the steps 46 for diffusing the discharge coolant with axial symmetry.

Figure 5:
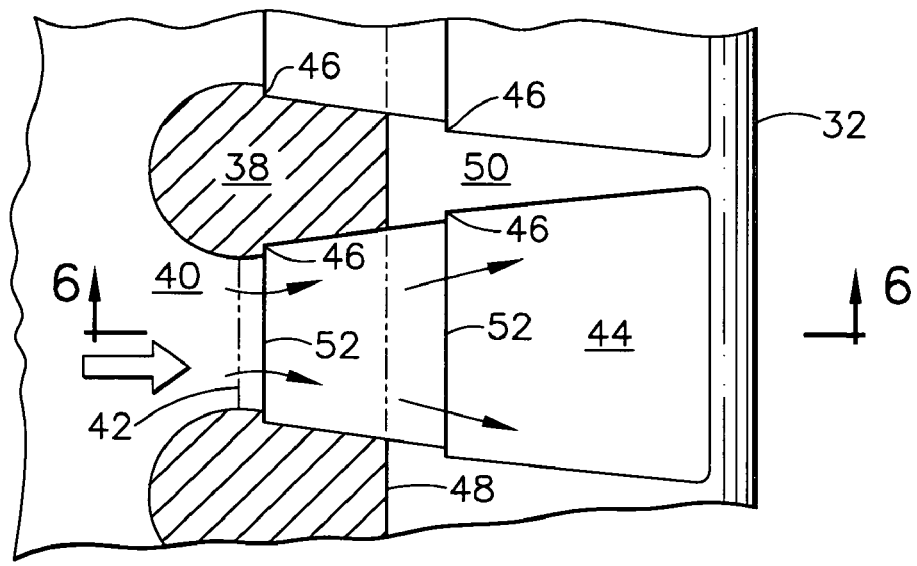
FIG. 5 is an enlarged elevational view, like FIG. 2, of the trailing edge outlet slots in accordance with an alternate embodiment.
Figure 6:
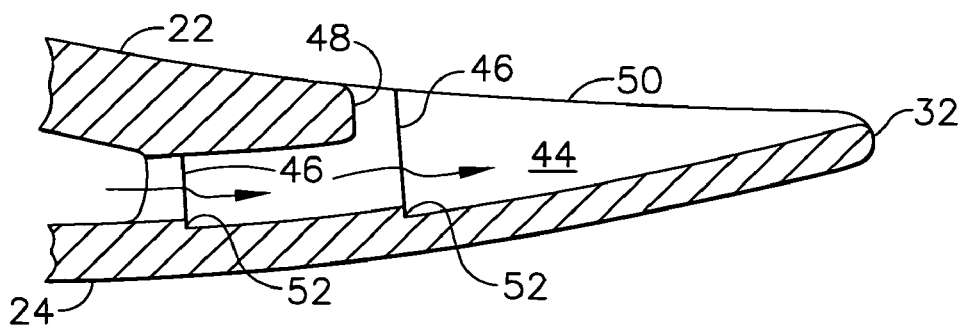
FIG. 6 is an axial sectional view through the trailing edge outlet slots illustrated in FIG. 5 and taken along line 6—6.

FIGS. 5 and 6 illustrate an alternate embodiment in which a pair of the steps 46 are disposed in series in each of the partitions 38. A forward step 46 is disposed in the sidewall of the partition forward of the breakout lip 48 inside the airfoil, and an aft step 46 is disposed aft of the breakout lip 48 in the exposed region of the slot outlet 44. In this way, two planes of step diffusion are effected at the series of steps 46 in the sidewalls of the partitions 38 for reducing the width of the partition in two stages, while also ensuring effective diffusion of the discharged coolant.

Furthermore, additional steps 52 may also be introduced in the otherwise smooth internal surface of the suction sidewall 24 along the outlet slots 36 in a two-dimensional configuration with the side steps 46. In this way, each outlet slot may first converge in area to the throat 42 and then increase in area to the first plane of two side steps 46 in the sidewalls of the partitions coplanar with a corresponding bottom step 52 in the internal surface of the suction sidewall. The area of the outlet slot may then further increase from the first plane of steps to the next plane of steps formed by two more side steps 46 and a coplanar bottom step 52.

The multistep configuration illustrated in FIGS. 5 and 6 may be more practical for use in larger turbine blades or nozzle vanes. And, the single plane steps illustrated in FIGS. 2-4 may be introduced in smaller turbine blades and nozzle vanes.

Accordingly, the simple introduction of the side steps 46 in the sidewalls of the partitions which form the outlet slots 36 may substantially improve cooling performance along the airfoil trailing edge. As indicated above, trailing edge slot cooling is complex in view of the thin converging geometry of the trailing edge. The coolant must be discharged through the diverging outlet slots with limited diffusion angle for preventing undesirable flow separation.

The discharged coolant is metered by the corresponding slot throats and must have a suitable blowing ratio to prevent undesirable blowoff of the film as it is discharged from the outlet slots. The relative surface area of the exposed outlets and exposed intervening lands affects the coverage of the discharged film cooling air and also affects mixing of the discharged air with the outside combustion gases.

The introduction of the Coanda side steps disclosed above in the slot partitions substantially reduces the width of the partitions and the lands exposed to the hot combustion gases. The area of the slot outlets increases relative to the thinner partition lands and improves the cooling thereof.

Enhanced flow diffusion may be obtained due to the Coanda steps for obtaining effective diffusion greater than that possible for the limiting value of the 7.5 degree diffusion angle. Enhanced film coverage is obtained from the row of slot outlets with a reduction in blowoff tendency of the discharged film cooling air. Higher film cooling effectiveness may be obtained for a given amount of air flow. Or, the same film cooling effectiveness may be obtained with less coolant flow due to better coverage and less mixing effected by the Coanda steps.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A turbine airfoil comprising:
opposite pressure and suction sidewalls extending longitudinally in span and axially in chord between opposite leading and trailing edges, and having an internal cooling circuit therein for circulating a coolant therethrough;
said pressure sidewall including a row of diverging outlet slots joined to said cooling circuit, and separated by corresponding converging partitions having opposite sidewalls defining sides of said slots;
each of said slots including in series a converging inlet, a throat of minimum flow area, and a diverging outlet exposed in said pressure sidewall, and separated from an adjacent outlet by an exposed converging land at the aft end of an intervening partition; and
each of said partitions includes a step in said partition sidewall for abruptly decreasing width of said partition and locally increasing divergence of said slots to diffuse said coolant discharged therethrough.

2. An airfoil according to claim 1 wherein each of said partitions converges aft from said slot throat to said step, and further converges aft from said step along said outlet.

3. An airfoil according to claim 2 wherein each of said outlets 44 breaches the external surface of said pressure sidewall at a breakout lip spaced forward from said trailing edge, and is bounded by said exposed lands at the aft ends of said partitions, with forward ends thereof extending forward from said lips.

4. An airfoil according to claim 3 wherein said partition lands converge aft from said lips, and are coplanar with the external surface of said pressure sidewall around said slot outlets.

5. An airfoil according to claim 4 wherein each of said partitions includes a corresponding step on opposite sides thereof for increasing flow area of said adjacent slots on corresponding opposite sides thereof.

6. An airfoil according to claim 5 wherein each of said slots decreases in flow area from said inlet to said throat thereof, and then increases in flow area from said throat to said step in said partition, and then further increases in flow area from said step to said outlet thereof.

7. An airfoil according to claim 6 wherein said steps are aligned coplanar with said breakout lips.

8. An airfoil according to claim 7 wherein said slots have a shallow divergence angle up to about 7.5 degrees between said partitions for diffusing said coolant discharged therethrough, and said divergence angles are substantially equal forward and aft of said steps.

9. An airfoil according to claim 7 wherein said steps are disposed in said partitions only, and the internal surface of said suction sidewall along said slots is smooth.

10. An airfoil according to claim 7 wherein each of said slots includes a single step in each of said partitions, and said partitions have flat and parallel sidewalls forward and aft of said steps.

11. A turbine airfoil comprising:
opposite pressure and suction sidewalls extending longitudinally in span and axially in chord between opposite leading and trailing edges;
said sidewalls being spaced apart between said leading and trailing edges to define an internal cooling circuit therein for circulating a coolant therethrough;
said pressure sidewall including a row of outlet slots extending therethrough along said trailing edge in flow communication with said cooling circuit for discharging said coolant therefrom;
said slots being separated from each other by corresponding partitions having opposite sidewalls defining sides of said slots, and each slot includes an inlet at a forward end of said partitions, a throat following said inlet, and an outlet along an aft end of said partitions; and
each of said slots diverges aft and includes a step in said partition sidewall increasing divergence for diffusing said coolant discharged therethrough.

12. An airfoil according to claim 11 wherein each of said partitions converges aft from said slot throat to said step, and further converges aft from said step along said outlet.

13. An airfoil according to claim 12 wherein each of said outlets breaches the external surface of said pressure sidewall at a breakout lip spaced forward from said trailing edge, and is bounded by exposed lands at the aft ends of said partitions, with forward ends thereof extending forward from said lips.

14. An airfoil according to claim 13 wherein said partition lands converge aft from said lips, and are coplanar with the external surface of said pressure sidewall around said slot outlets.

15. An airfoil according to claim 14 wherein said slots have a shallow divergence angle between said partitions for diffusing said coolant discharged therethrough, and said divergence angles are substantially equal forward and aft of said steps.

16. An airfoil according to claim 14 wherein said partitions have a shallow convergence angle being substantially equal forward and aft of said steps.

17. An airfoil according to claim 11 wherein each of said partitions includes a corresponding step on opposite sides thereof for abruptly decreasing width of said partition and increasing flow area of said adjacent slots on corresponding opposite sides thereof.

18. An airfoil according to claim 14 wherein each of said slots decreases in flow area from said inlet to said throat thereof, and then increases in flow area from said throat to said step in said partition, and then further increase in flow area from said step to said outlet thereof.

19. An airfoil according to claim 14 wherein said steps are aligned coplanar with said breakout lips.

20. An airfoil according to claim 14 wherein said steps are disposed in said partitions only, and the internal surface of said suction sidewall along said slots is smooth.

21. An airfoil according to claim 14 wherein said steps, are disposed both in said partitions and in the internal surface of said suction sidewall along said slots.

22. An airfoil according to claim 14 wherein each of said slots includes a single step in each of said partitions, and said partitions have flat and parallel sidewalls forward and aft of said steps.

23. An airfoil according to claim 14 wherein each of said slots includes a pair of said steps in series in each of said partitions.

* * * * *